Feb. 17, 1959  K. W. COUSE  2,874,317
ELECTRICAL MACHINES AND CHANGE-OVER PLATES THEREFOR
Filed July 7, 1955  5 Sheets-Sheet 1

Inventor:
Kibbey W. Couse
By Rudolph J. Jurick
Attorney

Feb. 17, 1959　　　K. W. COUSE　　　2,874,317
ELECTRICAL MACHINES AND CHANGE-OVER PLATES THEREFOR
Filed July 7, 1955　　　　　　　　　　5 Sheets-Sheet 2
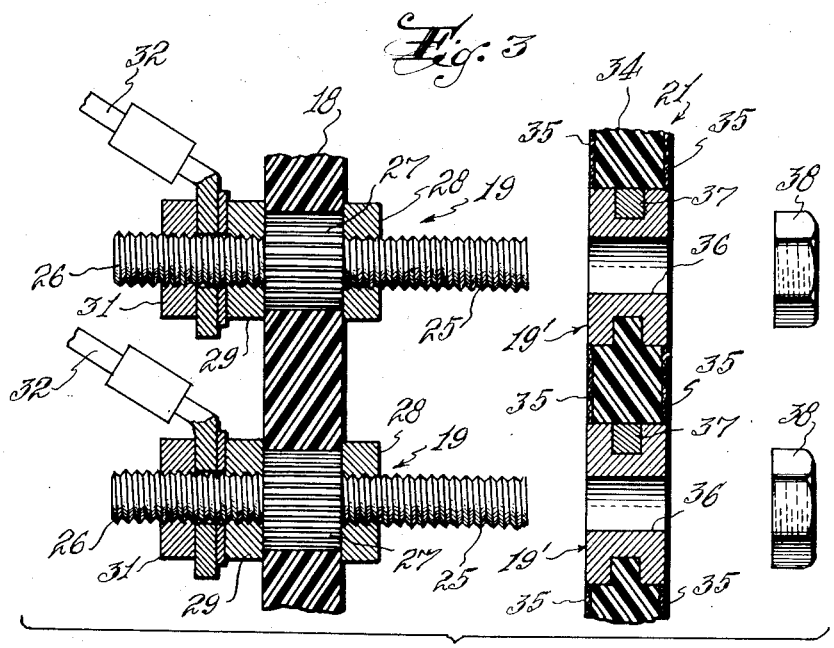
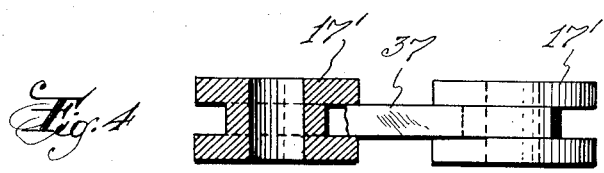
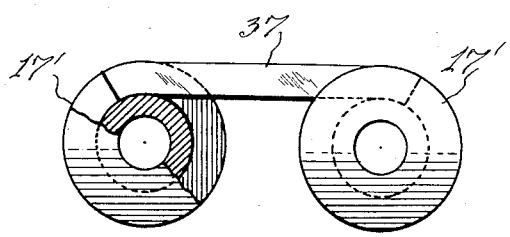
Inventor:
Kibbey W. Couse
By Rudolph J. Guerick
Attorney Feb. 17, 1959  K. W. COUSE  2,874,317
ELECTRICAL MACHINES AND CHANGE-OVER PLATES THEREFOR
Filed July 7, 1955  5 Sheets-Sheet 4
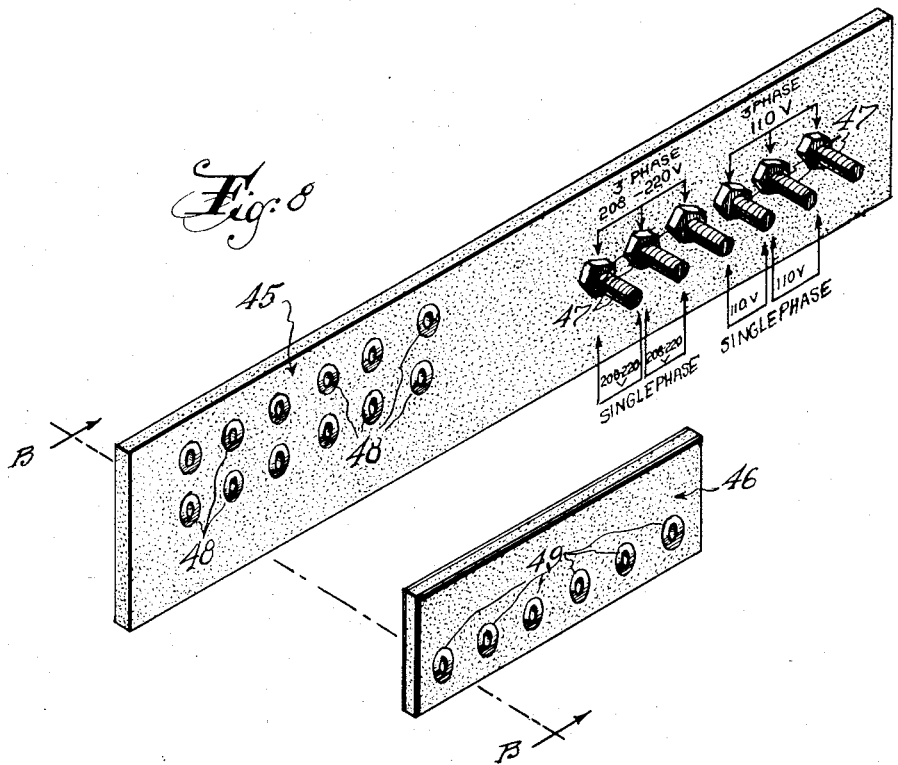
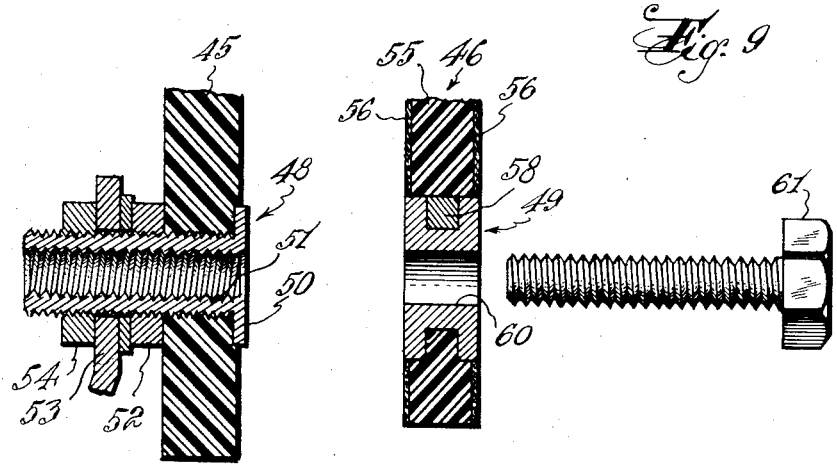
Inventor:
Kibbey W. Couse
By Rudolph J. Jurick
Attorney.

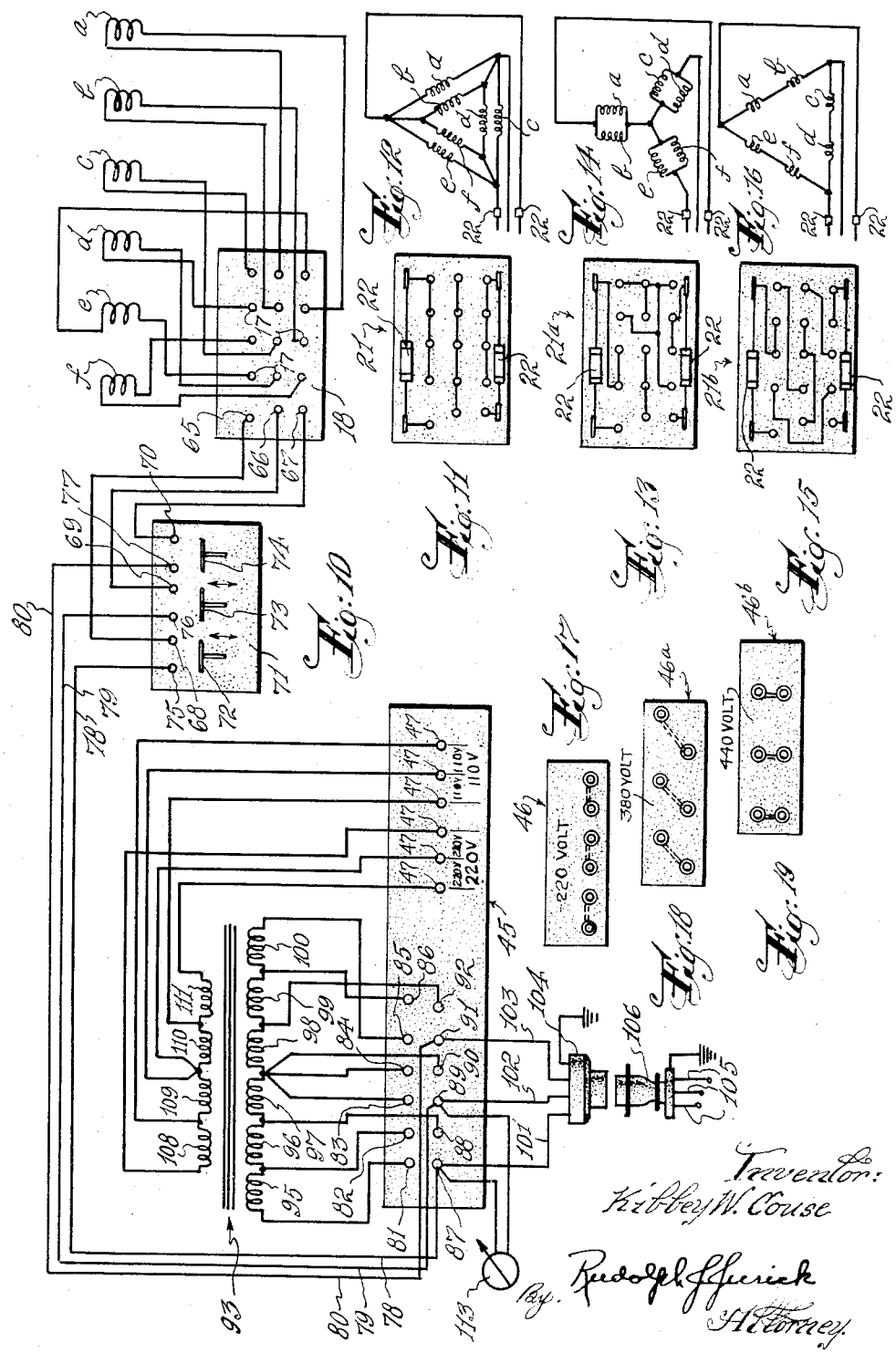

United States Patent Office 2,874,317
Patented Feb. 17, 1959

2,874,317

ELECTRICAL MACHINES AND CHANGE-OVER PLATES THEREFOR

Kibbey W. Couse, Newark, N. J., assignor to Couse Manufacturing, Inc., Newark, N. J., a corporation of New Jersey Application July 7, 1955, Serial No. 520,392

4 Claims. (Cl. 310—71)

This invention relates to an electrical power system of the class including a rotating electrical machine or motor-generator which may serve as a voltage generator when power driven or which may be energized as an electric motor from an external source of electrical energy and more particularly to a novel terminal board and voltage change-over plate arrangement whereby the field coils of the motor-generator may be connected for external energization by voltages having predetermined magnitudes or, alternatively, whereby the voltage output of the motor-generator will have a predetermined magnitude when the motor-generator armature is rotated at rated speed.

Electrical power systems of the class to which this invention is directed are particularly suitable for field use as, for example, in a mobile machine shop. Such shops generally are mounted on a truck or trailer chassis and include the necessary power machinery and tools for maintaining and repairing in the field vehicles, tanks, aircraft, etc. In addition to providing the necessary electrical power for operation of lathes, drill presses, welders, grinders, etc., included in the shop, the electrical power source must supply voltage for the lighting circuit and must also include outlet connections whereby voltages of proper value are available for the operation of other apparatus not forming an inherent part of the shop. This latter feature is particularly desirable since the shop is often used as an emergency generating station to supply electricity to an existing system. Since such existing system may be either 110, 220, 380 or 440 volts, the shop power system must afford a degree of flexibility such that the delivered power will have a voltage corresponding to that for which the particular system has been designed.

The primary source of power for driving the shop motor-generator is a gasoline or diesel engine. Consequently, when the shop is located in an isolated area it is self-sufficient. However, field shops of this type often are set up for operation in areas where electrical power is available as by tapping in to nearby power transmission lines. In such instances it is preferable to utilize the external electrical power for operation of the shop in the interest of increased efficiency and prolonging the operating life of the gasoline or diesel powered prime mover. Here too, the external electrical power may be either 110, 220, 380 or 440 volts and, consequently, the electrical circuitry of the shop must lend itself to energization at any one of such voltages.

Heretofore, the conditioning of the shop electrical power system (to serve either as a source of electrical energy for external use or as a receiver of external electrical energy for shop operation) involved considerable changing of electrical connections and required the services of a skilled technician. The broad object of the present invention is the provision of a novel circuit and terminal board arrangement whereby such change-over may be made quickly, positively and by unskilled help.

Another object of this invention is the provision of a motor-generator having a plurality of field windings individually connected to spaced terminals on a fixed terminal board, a voltage change-over plate having terminals arranged to correspond to certain terminals of the said fixed terminal board, leads imbedded in the said plate and connecting together selected terminals of the plate, and means for removably securing the said plate to the terminal board such that the terminals of the plate establish electrical contact with the corresponding terminals of the board.

Another object of this invention is the provision of a motor-generator having field windings individually connected to spaced terminals on a fixed terminal board, a plurality of voltage change-over plates each having terminals corresponding to certain terminals on said board, current-conducting wires, connection preselected terminals of each plate and means removably securing a selected one of said plates to the terminal board with the terminals of the plate in electrical contact with the corresponding terminals of the board, whereby the said field coils are connected together to provide a predetermined voltage output when the motor-generator armature is rotated at rated speed.

An object of this invention is the provision of a motor-generator having field coils individually connected to spaced terminals on a fixed terminal board and three color-coded, voltage change-over plates adapted for individual connection to the terminals of said board, the said plates respectively connecting the field coils in parallel delta, series delta or parallel Y arrangement, thereby correspondingly altering the voltage output of the motor-generator when its armature is rotated at rated speed.

An object of this invention is the provision of a transformer having a plurality of primary windings connected to spaced terminals on a fixed terminal board, voltage change-over plates each having interconnected terminals corresponding to certain terminals of said board, means for securing a selected plate to said board such that the terminals of the plate are in electrical contact with certain terminals of said board.

An object of this invention is the provision of a voltage change-over plate comprising a panel made of a thermoplastic material, fiber glass cloth bonded to the opposed surfaces of the panel, a pair of current-conducting members molded in and extending through the panel, each of said members having ends flush with the surface of the panel and central sections of reduced diameter, and a current-conducting lead having ends secured to the said central sections of the conducting members.

An object of this invention is the provision of a motor-generator having a plurality of field windings and an armature mounted on a shaft, a welding generator mounted on said shaft, means for rotating the shaft by a prime mover whereby a voltage is developed in said field coils, a fixed terminal board having a plurality of spaced terminals individually connected to the ends of the field coils, a voltage change-over plate having three output terminals and a plurality of spaced terminals corresponding to those on the said terminal board, leads connecting the output terminals of the plate to selected one of said spaced terminals, leads connecting together certain of the spaced terminals and means for removably connecting the plate to the board with the spaced terminals of the plate in electrical contact with the corresponding terminals of the board, the arrangement being such that the voltage change-over plate connects the said field coils to the said output terminals in a selected manner whereby the voltage across said output terminals will have a predetermined magnitude when the said shaft is rotated at rated speed.

These and other objects and advantages will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

Figure 3 is a fragmentary sectional view taken along the line A—A of Figure 2 and drawn to an enlarged scale;

Figure 4 is a side view, with parts in section, showing two terminals of the voltage change-over plate electrically connected together by a rectangular bus bar;

Figure 5 is a top view thereof, with parts in section;

Figure 8 is an isometric view showing the fixed terminal board that is disposed within the cubicle and the associated change-over plate;

Figure 9 is a fragmentary sectional view taken along the line B—B of Figure 8 and drawn to an enlarged scale;

Figure 10 is a schematic wiring diagram of the electrical circuit;

Figure 11 is a diagrammatic showing of a first voltage change-over plate for connecting the motor-generator field coils for 3 phase, 220 volt operation;

Figure 12 is a circuit diagram showing the motor-generator field coils connected in a parallel delta when the plate of Figure 11 is attached to the motor-generator terminal board;

Figure 13 is a diagrammatic showing of a second voltage change-over plate for connecting the motor-generator field coils for 3 phase, 380 volt operation;

Figure 14 is a circuit diagram showing the motor-generator field coils connected in a parallel Y when the plate of Figure 13 is attached to the motor-generator terminal board;

Figure 15 is a diagrammatic showing of a third voltage change-over plate for connecting the motor-generator field coils for 3 phase, 480 volt operation;

Figure 16 is a circuit diagram showing the motor-generator field coils connected in a series delta when the plate of Figure 15 is attached to the motor-generator terminal board; and Figures 17 to 19 are diagrammatic showings of the voltage change-over plates associated with the terminal board of the power transformer, each of said plates connecting the transformer primary windings for operation at the voltages corresponding respectively with the motor-generator voltage change-over plates shown in Figures 11, 13 and 15.

Figure 1:
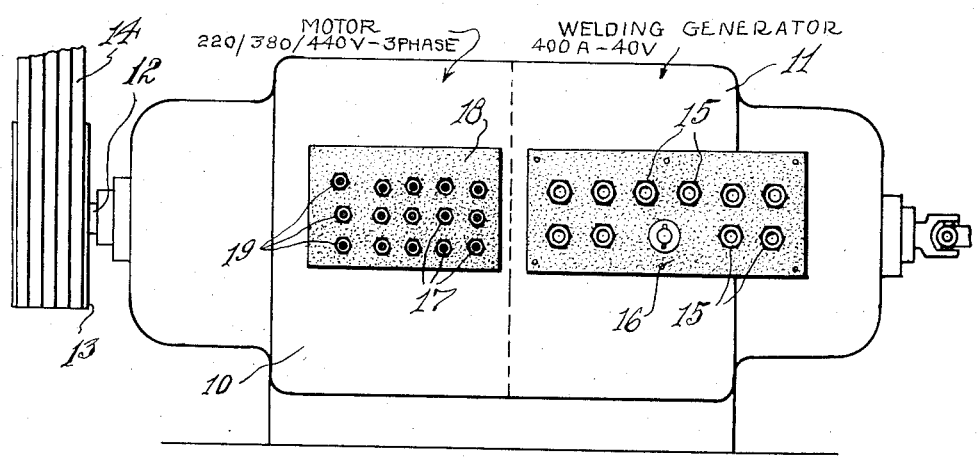
Figure 1 is a front elevational view showing a combination motor and welding generator mounted on a common shaft for rotation by a suitable prime mover.

Reference is now made to Figure 1 of the drawings wherein there is shown a combination unit comprising a motor-generator 10 and a direct-current welding generator 11 having a common shaft 12. A pulley 13 is secured to the shaft 12 and a belt 14 mechanically couples the unit to the power take-off of a prime mover such as a gasoline or diesel powered motor. When the shaft 12 is revolved at rated speed suitable D.-C. voltages are available at the jacks 15 carried by the panel 16. The cables which are connected to the welding head are provided with jacks adapted for frictional insertion into a selected pair of jacks for light, medium or heavy welding jobs, as is well known in this art. Further, when the motor-welding-generator unit is driven by the prime mover, an alternating voltage is developed in the field coils of the motor-generator. In the present case, the motor-generator includes six field coils that are individually connected to the threaded terminals 17 carried by the terminal board 18 that is secured to the motor-welding-generator housing in any suitable manner. The specific connection of the field coils to particular terminals will be described hereinbelow with specific reference to Figure 10. It is here pointed out, however, that by connecting jumpers between certain of the terminals 17, the motor-generator field coils can be connected to provide a 3 phase voltage output at the output terminals 19, such voltage output being either 220, 380 or 440 volts depending upon the particular jumper connection of the terminals 17. Such output voltage may be utilized to operate the shop machinery, may be tapped into an existing electrical system to provide emergency power and may be applied to a power transformer to provide single or polyphase voltages of lower value, all of which will be described in more detail hereinbelow. The point here stressed is the fact that the motor-generator, when driven by the prime mover, serves as a source of electrical energy of selected voltage and the value of the voltage may be altered as desired by making proper jumper connections across the various terminals carried by the fixed terminal board 18.

When the mobile shop is located in an area wherein 3 phase electrical power is available, it is preferable to use such power rather than operate the prime mover. In such instance, provision is made to operate the entire shop by the externally-available power. The terminals 19, on the motor-generator terminal board, are connected to the external power by means of suitable cables whereby the motor-generator operates as a motor driving the welding generator. Here too, suitable jumpers may be connected across the terminals 17 to connect the motor-generator field coils for operation at the particular voltage of the available external source. Specifically, if the external source is 220 volts, the motor-generator field coils are connected in parallel delta, if the external voltage is 380 volts the field coils are connected in parallel Y, whereas an external voltage of 440 volts requires that the field coils be connected in series delta. The connection of the field coils in proper manner is accomplished quickly and positively by means of voltage change-over plates having interconnected terminals correspondingly positioned to the terminals 17 and 19 on the motor-generator terminal board, as will now be described.

Figure 2:
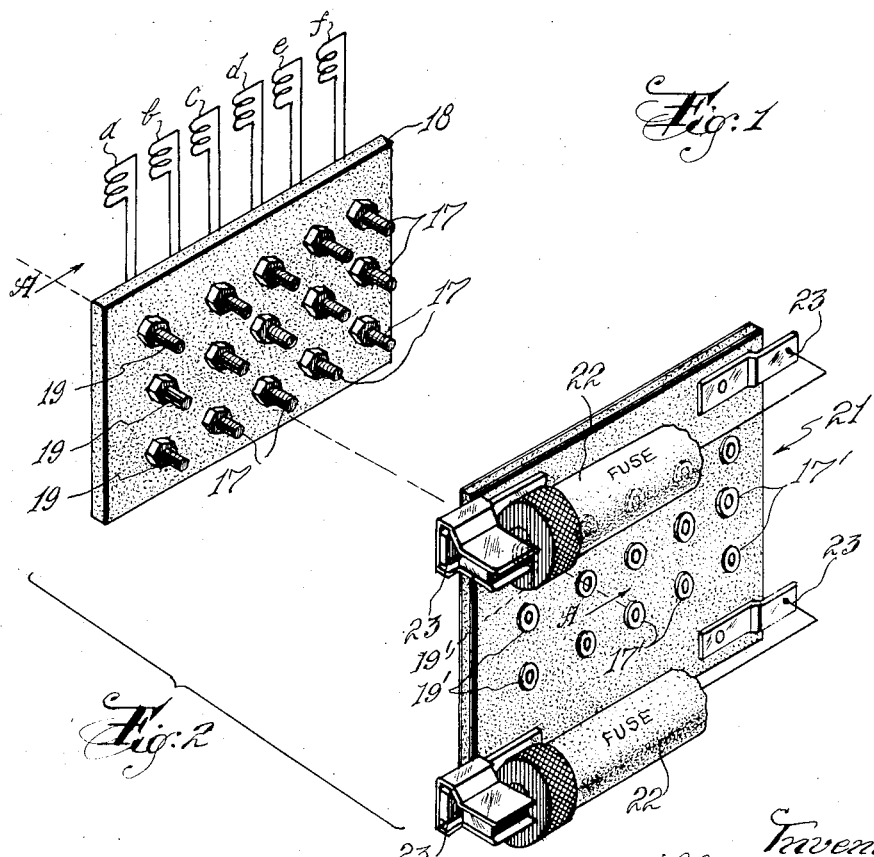
Figure 2 is an isometric view showing the fixed terminal board and one of the associated voltage change-over plates.

Reference is now made to Figure 2 which shows the fixed terminal board 18 of the motor-generator drawn to an enlarged scale. The six motor generator field coils $a$–$f$ are individually connected to the rear of the twelve threaded terminals 17. A voltage change-over plate 21 is provided with a plurality of terminals 17' spaced to correspond with the terminals 17 and terminals 19' spaced to correspond with the output terminals 19. Each of the terminals 17' and 19' pass through the insulator panel of the change-over plate and include axial holes of a diameter sufficient to clear the threaded terminals 17 and 19. Thus, the voltage change-over plate 21 may be disposed over the fixed terminal plate 18 with each of the threaded terminals thereof passing through the cooperating terminal of the change-over plate. Cap nuts threaded onto the protruding ends of the terminals 17 and 19 serve to secure the change-over plate firmly in position over the fixed terminal board 18 and to establish good electrical contact between each pair of the aligned terminals 17, 17' and 19, 19'. It will be apparent, then, that if the terminals of the change-over plate are suitably connected by jumpers, the positioning of the change-over plate on the fixed terminal board will result in a predetermined interconnection of the dynamotor field coils $a$–$f$. The change-over plate also carries two fuses 22 removably secured thereto by clips 23. These fuse clips are also connected to certain terminals of the change-over plate whereby the fuses are inserted into the proper points in the circuit to protect the motor-generator field coils.

I provide three voltage change-over plates of the type shown in Figure 2. These plates have identical terminal arrangements but different jumper connections. Thus, the first change-over plate has its terminals so connected that when the plate is inserted over the motor-generator terminal board, the field coils will be connected in parallel delta across the output terminals 19 whereby the field coils are conditioned for operation on 3 phase, 220 volts. The second voltage change-over plate serves to connect the field coils in parallel Y for operation on 3 phase, 380 volts, and the third change-over plate connects the field coils in series delta for operation on 440 volts. It will be apparent, therefore, that the operation of changing the field coil connections for operation on 220, 380 or 440 volts merely involves securing the proper change-over plate to the motor-generator fixed terminal board. Each change-over plate preferably is clearly marked with the appropriate voltage value and each such plate preferably is of a different color. Also, it will be noted that the output terminals 19 (and the corresponding terminals 19' of the change-over plate) are laterally spaced from the other terminals by a distance greater than the spacing between the terminals 17 so that it is impossible to install the change-over plates improperly on the fixed terminal board.

Figure 3 is a fragmentary sectional view taken along the line A—A of Figure 2 and drawn to an enlarged scale to show the construction of the motor-generator terminal board 18 and the voltage change-over plate 21. The fixed terminal board 18 is made of suitable insulating material such as Bakelite or Micarta. Each of the terminals 19 is made from a cylindrical bar of metal, such as copper or brass, having a knurled or splined surface. The rod is turned down and provided with externally threaded ends 25, 26 resulting in an enlarged-diameter central portion 27 retaining the knurled outer surface. A plurality of holes are formed in the terminal board, each hole having a diameter slightly less than that of the central portion 27 of the terminal, and the terminals are force-fitted into such holes. Thus, each terminal is firmly secured against rotation with the end surfaces of the central portion flush with the surfaces of the terminal board, as shown. Each terminal is provided with an outer nut 28 and an inner nut 29, said nuts exceeding the diameter of the terminal central portion to thereby prevent axial movement of the terminal relative to the terminal board. Suitable lugs 30 are secured to the inner ends of the terminals by nuts 31, said lugs having the leads 32 connected thereto as by soldering or brazing. Although Figure 3 shows two of the three output terminals 19, it will be understood the other terminals 17 (see Figure 2) are of similar construction and similarly secured to the terminal board 18.

The associated voltage change-over plate 21, shown in Figure 3, comprises a central section 34 made of a thermoplastic material such as, for example, a polyester with fiber glass cloth 35 bonded intimately to the opposed faces. The terminals 19' are generally cylindrical and may be made of copper or brass. Each such terminal is provided with an axial hole 36 of a diameter slightly larger than the threaded outer end 25 of the terminal 19 and a reduced diameter central portion which serves to accommodate the ends of a rectangular jumper 37. The jumpers are soldered or brazed to the respective terminals and the assembly of jumpers and terminals are molded directly into the plastic 34 with the end surfaces of the terminals flush with the cloth 35, as shown. From the showing of Figure 3, it will be apparent that the change-over plate 21 may be superposed over the fixed terminal board 18 with the outer threaded ends of the terminals 19 (and 17) projecting through the axial holes of the terminals 19' (and 17'). Cap nuts 38 cooperate with the terminal ends 25 to secure the change-over plate to the terminal board. Inasmuch as the ends of the terminals 19 abut against the nuts 28 and inasmuch as the cap nuts 38, when in position, engage the terminal ends 25 and the outer face of the terminals 19', a good electrical contact is assured between each cooperating set of terminals on the board 18 and plate 21. The internal jumpers 37 are connected between selected terminals of the change-over plate so as to connect the motor-generator field coils to the output terminals 19 in a predetermined manner.

Figures 4 and 5 are, respectively, elevation and plan views, with parts in section, showing one of the rectangular jumpers 37 connected to two terminals 17 of the voltage change-over plate. Such assemblies, and others wherein three or more terminals are connected by jumpers, are molded into the change-over plate by use of a suitable fixture. As stated hereinabove, three change-over plates are provided, each having jumper-connected terminals in such manner as to connect the motor-generator field coils in a predetermined manner when such plates individually are inserted over the motor-generator terminal board.

Figure 6:
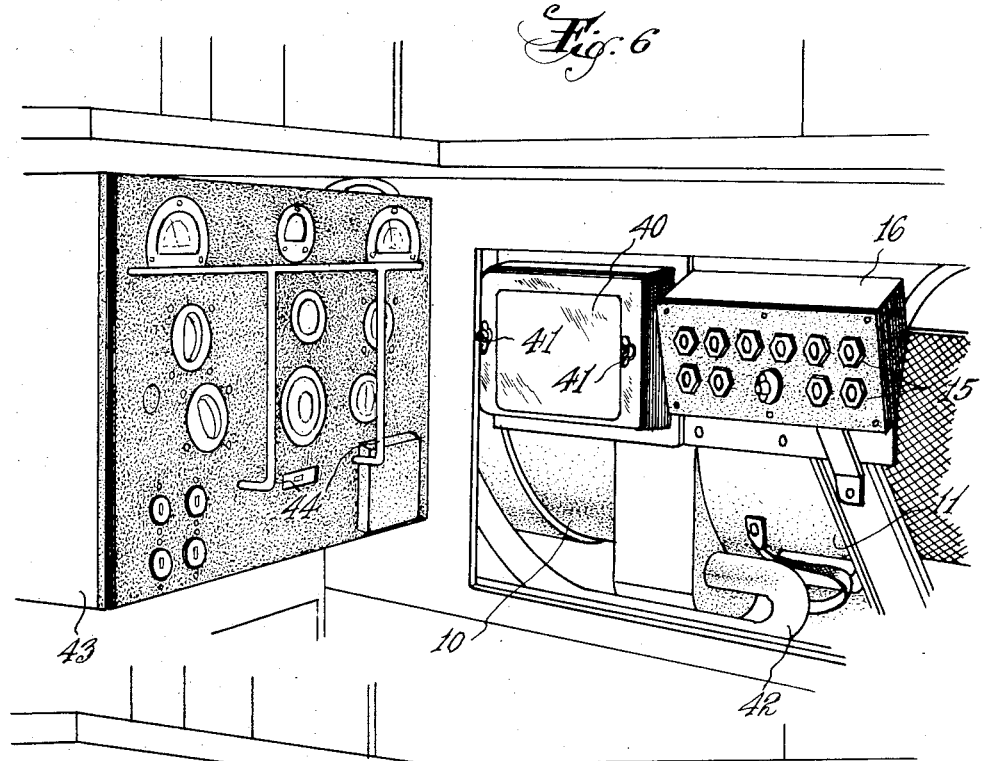
Figure 6 is an isometric view showing the motor-generator with a cover plate disposed over the fixed terminal board and a cubicle that houses various electrical components associated with the circuitry.

Reference is now made to Figure 6 which illustrates the motor-generator 10-welder 11 unit as installed in a mobile shop. Here are also visible the welder jacks 15 carried by the panel 16. The motor-generator terminal board is safely covered by a suitable cover 40 removably secured in place as by the wing nuts 41. Cables from the motor-generator terminal board pass through a suitable conduit into the cubicle 43 here shown with the door closed. Such cubicle houses components such as circuit breakers, rheostats, etc., and the door may carry necessary electrical measuring instruments and control knobs which preferably are protected against damage by the protruding rails 44.

Figure 7:
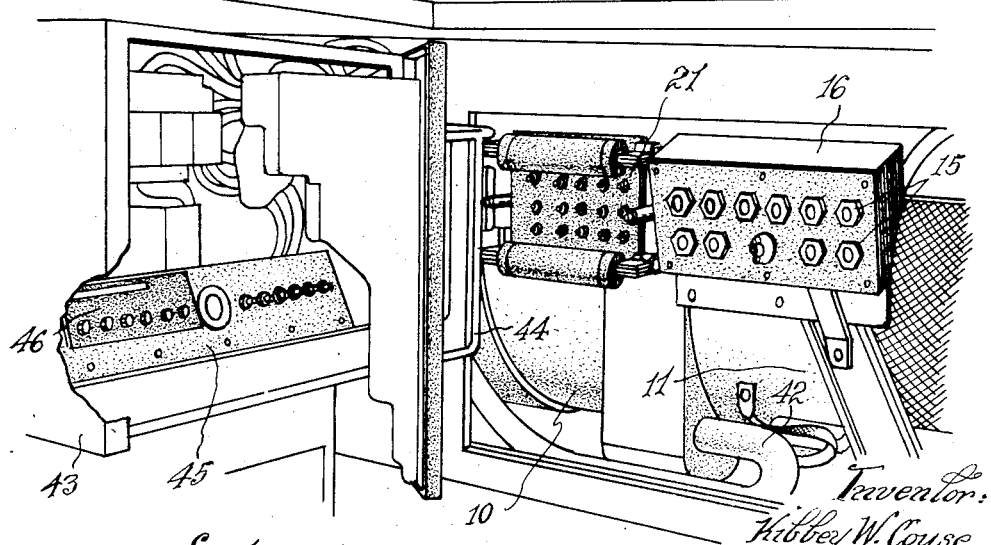
Figure 7 is similar to Figure 6 but with the door of the cubicle open and the cover removed from the motor-generator terminal board.

Figure 7 is similar to Figure 6 but with the cover removed to show a voltage change-over plate 21 positioned over the motor-generator terminal board, and the door of the cubicle open to expose primarily the terminal board 45 associated with the power transformer, not shown. A voltage change-over plate 46 is shown disposed over a portion of the terminal board 45 such plate serving to connect the primary windings of the transformer in proper manner for operation at a predetermined applied voltage, as will now be described.

The fixed terminal board 45 of the transformer is shown in Figure 8 as is also one of the associated voltage change-over plates 46. On the right hand portion of the board 45 are two sets of threaded terminals 47, arranged in groups of three. As will be described hereinbelow, these terminals are connected to the secondary windings of the power transformer to provide the indicated single phase and three phase voltages regardless of the voltage available for energizing the transformer primary windings. To accomplish this purpose the primary windings of the transformer are selectively connected to the terminals 48, disposed on the left hand portion and the specific winding connection is determined by the jumper connection of the corresponding terminals 49 on the change-over plate 46, in much the same manner as described hereinabove with reference to the voltage change-over plates associated with the fixed terminal board of the motor-generator.

The constructions of the cooperating transformer terminal board and change-over plate are shown in Figure 9 which is a fragmentary, sectional view taken along the line B—B of Figure 8 and drawn to an enlarged scale. The fixed terminal board 45 may be made of a suitable insulating material such as Bakelite or Micarta, and is provided with a plurality of holes terminating in enlarged bores to accommodate the heads 50 of the terminals 48. The shank 51 of the terminal is externally threaded whereby the terminal may be secured in position by a rear nut 52 and lugs 53 are individually secured to each terminal by nuts 54, such lugs having leads from the transformer primary winding soldered or brazed thereto. As in the case of the motor-generator voltage change-over plates, the transformer change-over plate 64 comprises a center portion 55 of thermoplastic material enclosed within fiber glass cloth 56 that is intimately bonded thereto. Also, similarly, the terminals molded in the change-over plate are provided with reduced-diameter central sections forming grooves within which the ends of rectangular jumpers 58 are secured as by soldering or brazing. In the case of the transformer change-over plate 46, the terminals are provided with axial clearance holes 60 affording passage of the threaded cap screws 61 therethrough. Thus, the plate 46 is secured to the terminal board 45 by the screws 61 threaded into the internally-threaded holes provided in the cooperating terminals 48 of the fixed terminal board 45.

It is here pointed out that the voltage change-over plates, being made of a thermoplastic material such as a polyester, are somewhat flexible. Such characteristic is desirable to prevent cracking of the plates when they are firmly secured to the associated fixed terminal boards. Also, the fiber glass cloth adds to the overall strength of the plate. Further, the cloth covering preferably is impregnated with a pigmented plastic to provide different colors on plates designed for different voltages, for example, the 220 volt change-over plates (both motor-generator and transformer) may be yellow, the 380 volt plates may be blue and the 440 volt plates may be green. This reduces the possibility of applying non-matching voltage plates to the transformer and motor-generator terminal boards and thereby developing an improper voltage across the two sets of terminals 47 shown in Figure 8.

Having described the construction, arrangement and cooperating use of the voltage change-over plates, reference is now made to Figure 10 which is a simplified diagram of the electrical circuitry. The motor-generator field coils a–f are individually connected as shown to the terminals 16 of the motor-generator terminal board 18. For purposes of the following description, the three motor-generator output terminals identified collectively by the numeral 19 in Figure 2, are here separately identified by the numerals 65, 66, 67. The 220 volt (preferably yellow-colored) motor-generator change-over plate 21 is shown in Figure 11 and the internal jumper connections between the terminals of such plate and the fuse clips are shown in heavy lines. If it be assumed this change-over plate is superposed over the fixed terminal board 18, Figure 10, the internal jumpers of the plate connect the six motor-generator field coils in a parallel delta, as shown in Figure 12, across the output terminals 65, 66, 67, with the fuses 22 in the outer legs. If, however, the second 380 volt change-over plate 21a, shown in Figure 13, is superposed over the motor-generator terminal board the jumpers of such plate connect the six motor-generator field coils in a parallel delta (see Figure 14) across the motor-generator output terminals 65, 66, 67. Superposing the 440 volt change-over plate 21b, shown in Figure 15, over the motor-generator terminal board connects the field coils in a series delta, see Figure 16, across the motor-generator output terminals 65, 66, 67. The plates 21a and 21b preferably are colored blue and green, respectively.

Referring again to the circuit diagram of Figure 10, it will be noted that the motor-generator output terminals 65, 66, 67 are connected to spaced stationary contacts 68, 69, 70 of a 3-pole, single-throw switch 71 having the movable contacts 72, 73, 74. The cooperating stationary contacts 75, 76, 77 are connected by the respective leads 78, 79 and 80 to terminals on the fixed transformer terminal board 45. Whereas in Figure 8, the terminals of the transformer fixed terminal board are collectively identified by the numeral 48 such terminals are individually identified in Figure 10 by the numerals 81–92 to facilitate the description of the circuitry. The power transformer 93 has six (6) coils 95–100 forming the primary winding. These coils are connected in series with each coil end connected to an appropriate one of the terminals carried by the terminal board 45, as shown, and the three leads 78, 79 and 80, running from the switch 71, respectively are connected to the terminals 87, 89 and 91. It will be noted that three cables 101, 102 and 103 extend from the socket 104 to these same terminals 87, 89 and 91. Thus, it will be apparent that if the motor-generator is driven by the prime mover and the switch 71 is closed, the voltages appearing across the motor-generator output terminals 65, 66, 67 will also appear across the transformer terminals 87, 89 and 91 and also across the cables 101, 102 and 103. Such voltages may be taken externally of the shop by means of suitable cables 105 connected to the leads 101, 102 and 103 by insertion of the connector plug 106 into the socket 104. Similarly, if the prime mover is disengaged from the motor-generator, an external 3 phase voltage may be supplied to the terminal board 45 to energize the power transformer and to drive the motor-generator. In either case, since the D.-C. welding generator and motor-generator are mounted on the same shaft, welding voltages are available. So too, the indicated voltages are available at the terminals 47, both when the motor-generator is operated as a generator and when an external power line is connected to the transformer terminal board through the connector plugs 104, 106. It will be noted that the transformer secondary winding comprises the four, equal coils 108, 109, 110, 111, connected in open delta, the coils 109 and 110 developing 110 volts, 3 phase, and the four coils developing 220 volts, 3 phase. The transformer primary coils are wound to a proper turns ratio to develop these voltages in the secondary coils, it being essential that two, four or six of such primary coils are effective when the voltages applied to the transformer respectively are 220, 380 and 440 volts. The connection of the transformer primary winding for operation at a particular such voltage is accomplished by means of the transformer voltage change-over plates 46, 46a and 46b shown diagrammatically in Figures 17, 18 and 19, respectively. The 220 volt transformer change-over plate shown in Figure 17 and the motor-generator change-over plate 21 shown in Figure 11 constitutes a pair, and are to be used whenever 220 volts is available from the outside source or when the motor-generator is used to supply voltage of this value to an external electrical system. Similarly, the change-over plates shown in Figures 18 and 13 constitute a pair of 380 volt operations whereas the plates shown in Figures 19 and 15 serve for conditioning the circuitry for 440 volt operation. The transformer change-over plates 46, 46a and 46b preferably are colored yellow, blue and green to correspond to the color of the matching motor-generator change-over plates.

Assume that the 220 volt change-over plate 46 (shown in Figure 17) is placed into position over the aligned terminals on the transformer terminal board 45 shown in Figure 10. It is to be noted that such plate contains only a lower row of six terminals connected together in pairs. Such plate, then, effectively connects together the terminals 87 and 88, 89 and 90, and 91 and 92, from which it will be apparent that only the primary coils 97 and 98 of the transformer are connected across the leads 78, 79 and 80. Consequently, if the output voltage of the motor-generator is 220 volts across each of the three (3) phases (as will be the case when the 220 volt voltage change-over plate is used) the voltage generated in each of the transformer secondary coils 108–111 will be 110 volts. So too, if the voltage of the external power source is 220 volts, three (3) phase, a voltmeter 113 connected across one phase of the polyphase voltage may be used to measure the voltage applied to the transformer.

The same considerations apply when the apparatus is conditioned for operation on 380 volts, three phase. In this case the motor-generator change-over plate 21a, Figure 11, is inserted over the motor-generator terminal board and the corresponding change-over plate 46a, Figure 18, is inserted over the transformer terminal board. As has already been explained, the motor-generator change-over plate connects the field coils in parallel Y whereby the motor-generator will develop 380 volts across its output terminals or, alternatively, 3 phase, 380 volts applied to the motor-generator output terminals will cause the motor-generator to operate as a 380 volt motor. As shown in Figure 18, the 380 volt transformer change-over plate has only six (6) terminals with diagonally-disposed terminals internally connected in pairs. A study of Figure 10 will show that such change-over plate connects the four (4) transformer primary coils 96, 97, 98, 99 across the transformer input terminals 87, 89, 91. The turns ratio of these primary coils is such that each of the four secondary coils 108–111 develops 110 volts when the voltage applied to the primary coils is 380. Similarly, the placement of the 440 volt transformer change-over plate, Figure 19, over the transformer terminal board connects all six primary coils 95–100 across the transformer input terminals thereby again maintaining a voltage development of 110 volts in each of the four secondary coils when the voltage applied to the transformer is 440 volts. In the latter case, of course, the corresponding motor-generator change-over plate 21b, Figure 15, is placed over the motor-generator terminal board.

From the above description it will be apparent that I provide apparatus and circuitry including a motor-generator having an associated fixed terminal board, and a power transformer also having an associated fixed terminal board. The field coils of the motor-generator are connected in a specific manner to the terminals of its terminal board and the primary coils of the transformer are likewise connected in a specific manner to the terminals of its terminal board, all to the end that the field coils and primary coils may be conditioned for operation on any one of three different voltages; namely, 220, 380 and 440 volts. This is accomplished simply, quickly and positively by merely installing the appropriate set of voltage changeover plates on the terminal boards. Such plates are color coded, marked with the appropriate voltage values, and the terminals thereof are arranged so that the plates can only be installed in proper position. These latter features remove any possibility of mistake. Further, the voltage change-over plates are of slightly flexible character to prevent cracking thereof when the associated securing nuts and bolts are tightened. Each set of voltage change-over plates accomplishes a complete rewiring of the electrical system to deliver out or receive a particular voltage and the change-over can be made by any person since no knowledge of electricity is required. This feature is of particular value to users of mobile shops especially the armed services. The corresponding plates of each set each have the same number of terminals so that the fastening cap nuts and bolts are always replaced and cannot be lost.

Having now given a detailed description of my invention in accordance with the requirements of the patent statutes what I desire to protect by Letters Patent of the United States is set forth in the following claims.

I claim:

1. An electrical system comprising a dynamo electric machine having a plurality of field coils, a fixed terminal board having a set of output terminals and a set of spaced terminals, leads individually connecting the dynamo electric machine field coils to the said spaced terminals, a voltage change-over plate having a set of output terminals and a set of spaced terminals correspondingly disposed to the similar terminals of the said fixed terminal board, jumpers fixed to the said plate and electrically connecting certain of the output and spaced terminals of the change-over plate, and means removably securing the change-over plate to the fixed terminal board and thereby establishing electrical connection between the correspondingly disposed terminals of the plate and terminal board whereby the dynamo electric machine field coils are electrically connected to the output terminals of the fixed terminal board through the output terminals of the change-over plate, the output terminals of the fixed terminal board being electrically disconnected from the dynamo electric machine field coils when the change-over plate is removed from the fixed terminal board.

2. The invention as recited in claim 1, including fuses carried by fuse clips secured to the change-over plate, and leads connecting the fuse clips to selected terminals of said change-over plate whereby certain output terminals thereof are connected through the fuses to certain various spaced terminals of the change-over plate.

3. An arrangement for connecting the field coils of a dynamo electric machine in a selected manner to a set of output terminals said arrangement comprising a fixed terminal board carrying the said output terminals and a plurality of spaced terminals; leads individually connecting the field coils to the said spaced terminals; a plurality of voltage change-over plates each plate having terminals individually corresponding to the output terminals and spaced terminals of the fixed terminal board; electrical jumpers fixed to the said plate and connecting together the output and spaced terminals of each plate in a preselected manner; and means for removably securing a selected change-over plate to the said fixed terminal board with the individual terminals of such plate in electrical contact with the cooperating terminal of the terminal board whereby the field coils of the dynamo electric machine are electrically connected to the output terminals of the fixed terminal board through the output terminals of the change-over plate, the output terminals of the fixed terminal board being electrically disconnected from the dynamo electric machine field coils when the change-over plate is removed from the fixed terminal board.

4. The invention as recited in claim 3, wherein each change-over plate carries a pair of fuses, means connecting the fuses to selected terminals of the plate whereby each pair of fuses is electrically-connected between the dynamo electric machine field coils and two of the fixed terminal board output terminals when any one of the plates is secured to the terminal board.

References Cited in the file of this patent

UNITED STATES PATENTS

| | | |
|---|---|---|
| 881,878 | Wright | Mar. 10, 1908 |
| 1,754,645 | Oswald | Apr. 15, 1930 |
| 1,969,529 | Shafer | Aug. 7, 1934 |
| 2,321,999 | Dalton | June 15, 1943 |
| 2,414,125 | Rheinfrank | Jan. 14, 1947 |
| 2,531,719 | Alvino | Nov. 28, 1950 |
| 2,543,131 | Seifried | Feb. 27, 1951 |
| 2,594,069 | Poehlmann | Apr. 22, 1952 |
| 2,642,920 | Simon et al. | June 23, 1953 |

FOREIGN PATENTS

| | | |
|---|---|---|
| 620,894 | Germany | Oct. 29, 1935 |
| 1,019,704 | France | Nov. 5, 1952 |
| 1,032,617 | France | Apr. 1, 1953 |

OTHER REFERENCES

"Reinforcement of Polyester Laminates With Fabrics," article by Gallagher et al. in Modern Plastics, March 1950, pp. 111 to 114, 116, 118, 120, and 172.

"Direct-Current Machinery" (Siskind), McGraw-Hill (New York), 1952, pp. 286–288.